(12) United States Patent
Sullivan

(10) Patent No.: US 7,571,564 B2
(45) Date of Patent: Aug. 11, 2009

(54) FISH HARVESTING HEAD

(76) Inventor: Kevin Michael Sullivan, 633 Ramey Rd., Lakemont, GA (US) 30552

( * ) Notice: Subject to any disclaimer, the term of this patent is extended or adjusted under 35 U.S.C. 154(b) by 0 days.

(21) Appl. No.: 11/875,325

(22) Filed: Oct. 19, 2007

(65) Prior Publication Data
US 2009/0100738 A1 Apr. 23, 2009

(51) Int. Cl.
*A01K 81/04* (2006.01)
*A01K 81/00* (2006.01)

(52) U.S. Cl. ............................................. 43/6; 473/582
(58) Field of Classification Search ........................ 43/6; 473/578, 582–584
See application file for complete search history.

(56) References Cited

U.S. PATENT DOCUMENTS

| | | | | |
|---|---|---|---|---|
| 4,872 A | * | 12/1846 | Randall | 43/6 |
| 8,862 A | * | 4/1852 | Stillman | 43/6 |
| 362,183 A | * | 5/1887 | Runyon | 43/6 |
| 707,683 A | * | 8/1902 | Farwell | 43/6 |
| 798,654 A | * | 9/1905 | Bliler | 43/6 |
| 828,509 A | * | 8/1906 | Rounsburg | 43/6 |
| 834,442 A | * | 10/1906 | Aungst | 43/6 |
| 1,076,036 A | * | 10/1913 | Hepner et al. | 43/6 |
| 1,344,693 A | * | 6/1920 | Hinsdale | 43/6 |
| 1,403,550 A | * | 1/1922 | Hinsdale | 43/6 |
| 1,465,267 A | * | 8/1923 | Henry | 43/6 |
| 1,832,727 A | * | 11/1931 | Nixon | 43/6 |
| 2,118,147 A | * | 5/1938 | Blodgett et al. | 43/6 |
| 2,194,016 A | * | 3/1940 | Geller | 43/6 |
| 2,212,345 A | * | 8/1940 | Krieger | 43/6 |
| 2,289,284 A | * | 7/1942 | Chandler | 473/584 |
| 2,455,784 A | * | 12/1948 | Lapsensohn | 43/6 |
| 2,464,048 A | * | 3/1949 | Marcus et al. | 43/6 |
| 2,540,387 A | * | 2/1951 | Butler | 43/6 |
| 2,599,626 A | * | 6/1952 | Gottschalk et al. | 43/6 |
| 2,725,656 A | * | 12/1955 | Schmidt | 43/6 |
| 2,753,643 A | * | 7/1956 | Recker | 43/6 |
| 2,770,905 A | * | 11/1956 | Efraimson | 43/6 |
| 2,789,856 A | * | 4/1957 | Russell | 43/6 |
| 2,795,882 A | * | 6/1957 | Gaggioli | 43/6 |
| 2,806,317 A | * | 9/1957 | Minisini | 43/6 |
| 2,819,674 A | * | 1/1958 | Prodanovich | 43/6 |
| 2,820,634 A | * | 1/1958 | Vance | 43/6 |
| 2,859,970 A | * | 11/1958 | Doonan | 43/6 |
| 2,904,338 A | * | 9/1959 | Podufal | 43/6 |
| 2,923,285 A | * | 2/1960 | Salles | 43/6 |
| 2,937,873 A | * | 5/1960 | Grissinger | 43/6 |
| 2,939,708 A | * | 6/1960 | Scheib | 43/6 |
| 2,951,306 A | * | 9/1960 | Woodfield | 43/6 |

(Continued)

*Primary Examiner*—Darren W Ark
(74) *Attorney, Agent, or Firm*—Akerman Senterfitt; Michael K. Dixon

(57) ABSTRACT

A fish harvesting head with a rotatable barb device that is held in place with a piercing tip and is configured to move between fish piercing, fish retaining and fish releasing positions. The fish harvesting head is formed from a fish harvesting body having a barb receiving slot positioned in the forward portion of the fish harvesting body that extends along a longitudinal axis of the fish harvesting body. The barb receiving slot enables the barb to be quickly replaced or removed. The fish harvesting head may also include a piercing tip retaining device positioned in the barb receiving slot and in contact with an inner surface of the piercing tip for increasing resistance to movement of the piercing tip relative to the fish harvesting body and prevent accidental loosening of the tip.

8 Claims, 1 Drawing Sheet

U.S. PATENT DOCUMENTS

| | | | | |
|---|---|---|---|---|
| 2,963,811 A * | 12/1960 | Nelson | | 43/6 |
| 2,993,697 A * | 7/1961 | Urban | | 43/6 |
| 3,014,305 A * | 12/1961 | Yurchich | | 43/6 |
| 3,022,077 A * | 2/1962 | Doonan | | 43/6 |
| 3,036,395 A * | 5/1962 | Nelson | | 43/6 |
| 3,036,396 A * | 5/1962 | Swails | | 43/6 |
| 3,050,897 A * | 8/1962 | Pitts | | 43/6 |
| 3,083,490 A * | 4/1963 | Klozik | | 43/6 |
| 3,138,383 A * | 6/1964 | McKinzie | | 43/6 |
| 3,164,385 A * | 1/1965 | Shure | | 473/582 |
| 3,320,941 A * | 5/1967 | Houghton | | 43/6 |
| 3,600,835 A * | 8/1971 | Hendricks | | 43/6 |
| 3,766,678 A * | 10/1973 | Reaves | | 43/6 |
| 3,878,788 A * | 4/1975 | Ah Sam | | 43/6 |
| 3,945,642 A * | 3/1976 | Henthorn, Jr. | | 43/6 |
| 4,624,068 A * | 11/1986 | Howard, III | | 43/6 |
| 4,642,929 A * | 2/1987 | Franklin | | 43/6 |
| 4,685,239 A * | 8/1987 | LaMonica | | 43/6 |
| 4,718,189 A * | 1/1988 | Stude | | 43/6 |
| 4,742,637 A * | 5/1988 | Musacchia | | 43/6 |
| 4,807,382 A * | 2/1989 | Albrecht | | 43/6 |
| 4,819,360 A * | 4/1989 | Thomas | | 43/6 |
| 4,823,492 A * | 4/1989 | Rogers | | 43/6 |
| 4,896,450 A * | 1/1990 | Rogers | | 43/6 |
| 4,901,467 A * | 2/1990 | Stolpe | | 43/6 |
| 4,905,397 A * | 3/1990 | Juelg, Jr. | | 43/6 |
| 4,924,619 A * | 5/1990 | Dowell | | 43/6 |
| 4,982,523 A * | 1/1991 | Garton | | 43/6 |
| 5,033,220 A * | 7/1991 | Phelps | | 43/6 |
| 5,094,464 A * | 3/1992 | Musacchia, Sr. | | 43/6 |
| 5,119,579 A * | 6/1992 | Hullihen et al. | | 43/6 |
| 5,243,778 A * | 9/1993 | Henley | | 43/6 |
| 5,570,530 A * | 11/1996 | Lee | | 43/6 |
| 6,077,179 A * | 6/2000 | Liechty, II | | 473/582 |
| 6,258,000 B1 * | 7/2001 | Liechty, II | | 473/583 |
| 6,306,053 B1 * | 10/2001 | Liechty, II | | 473/583 |
| 6,428,433 B1 * | 8/2002 | Liechty, II | | 473/583 |
| 6,669,586 B2 * | 12/2003 | Barrie et al. | | 473/583 |
| 6,789,346 B1 * | 9/2004 | Holler | | 43/6 |
| 6,811,503 B2 * | 11/2004 | May et al. | | 43/6 |
| 6,883,264 B1 * | 4/2005 | Gimbel | | 43/6 |
| 7,311,621 B2 * | 12/2007 | Sullivan et al. | | 473/583 |
| 2006/0042144 A1 * | 3/2006 | Rogers | | 43/6 |
| 2006/0064916 A1 * | 3/2006 | Shiflett | | 43/6 |
| 2007/0084103 A1 * | 4/2007 | Rogers et al. | | 43/6 |
| 2008/0060250 A1 * | 3/2008 | May | | 43/6 |
| 2008/0234079 A1 * | 9/2008 | Butcher | | 473/584 |
| 2008/0263931 A1 * | 10/2008 | Butler | | 43/6 |
| 2008/0263932 A1 * | 10/2008 | Butler | | 43/6 |

* cited by examiner

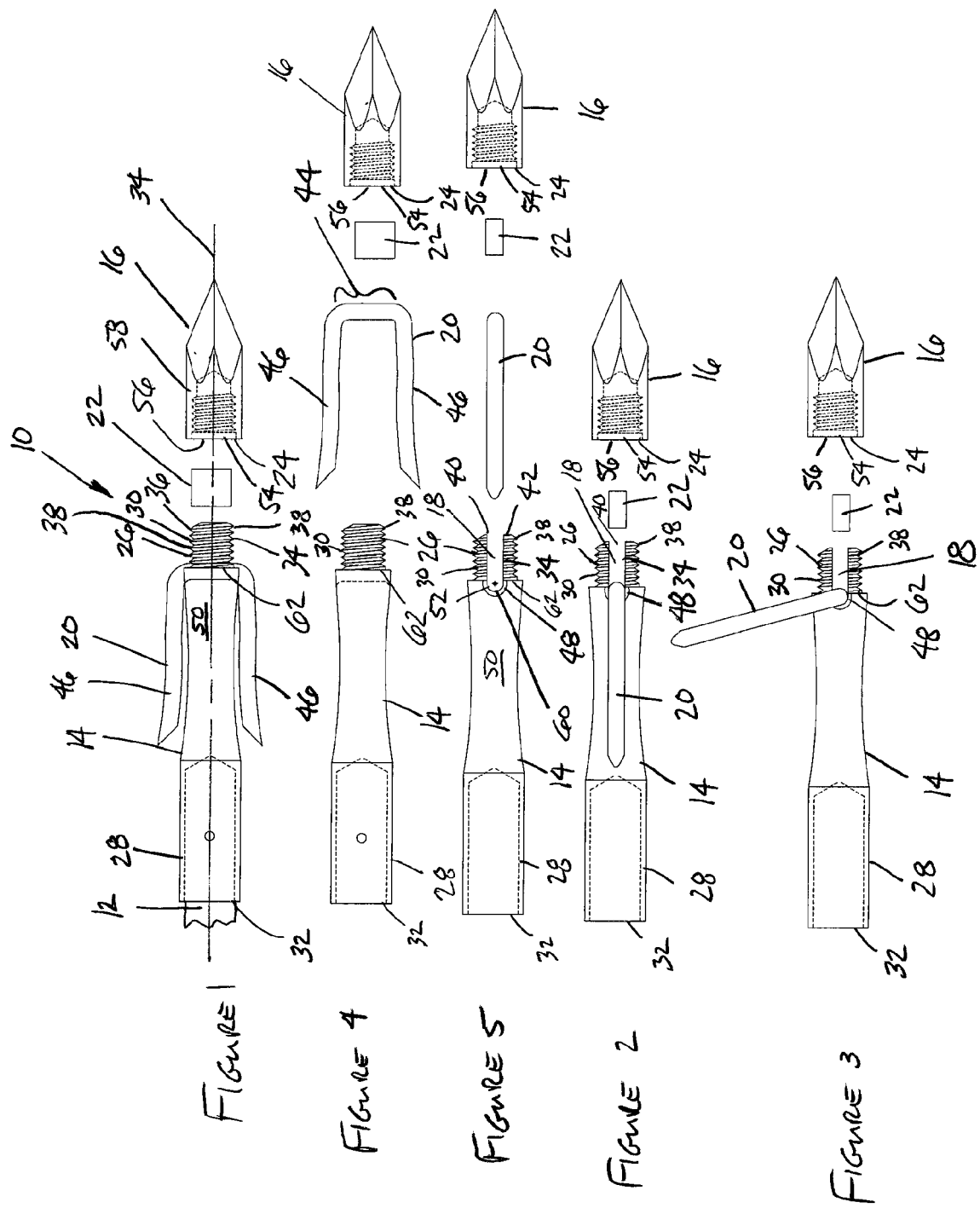

FISH HARVESTING HEAD

FIELD OF THE INVENTION

This invention is directed generally to fish harvesting systems, and more particularly to tips such as arrowheads usable for bowfishing and spearfishing tips.

BACKGROUND

Bowfishing equipment has been used throughout the years to successfully harvest fish of all varieties. Typically, an arrow used for bowfishing includes an arrowhead with a barb for keeping the fish attached to the arrow once shot. One such example is disclosed in U.S. Pat. No. 4,742,637. The '637 patent discloses a bowfishing arrowhead formed from a tip with a rotatable barb. The rotatable barb is confined in a hole in the arrowhead and is not removable. Damage to the barb results in destruction to the head.

The bowfishing head of the '637 patent also includes a threaded tip. The tip may be placed into position to prevent rotation of the barb. However, during use, the tip often loosens, which causes loss of fish or the tip when the barb rotates to a fish releasing position and releases a fish.

SUMMARY OF THE INVENTION

This invention relates to a fish harvesting head attachable to a shaft usable to be shot through a fish to harvest the fish. The fish harvesting head may be attached to an arrow and usable to harvest fish with a bow and arrow. Alternatively, the fish harvesting head may be attached to a spear shaft to harvest fish with spearfishing equipment. The fish harvesting head may be formed from a fish harvesting body with a piercing tip releasably attached thereto. The fish harvesting body may include a barb receiving slot configured to releasably contain a barb device. The barb receiving slot may be configured such that the barb device may be easily replaceable if damaged or removable to facilitate conversion of the fish harvesting head to a practice point for shooting at targets or facilitate removal of the head from an object that was shot. The fish harvesting body may also include a piercing tip retaining device positioned in the barb receiving slot and in contact with an inner surface of the piercing tip for increasing resistance to movement of the piercing tip relative to the fish harvesting body, thereby ensuring that the piercing tip is not accidentally loosened to allow the piercing tip to rotate to a fish releasing position.

A fish harvesting head may be formed from a fish harvesting body having a forward portion and a rear portion, wherein the forward portion includes a connection device and the rear portion includes a connection device for attachment to an arrow. The connection device on the forward portion of the fish harvesting body may include threads engaged with threads of the releasable connection device of the piercing tip. A barb receiving slot may be positioned in the forward portion of the fish harvesting body that extends along a longitudinal axis of the fish harvesting body, extends a width of the fish harvesting body with openings on side surfaces of the fish harvesting body and includes an opening on a distal outer surface of the fish harvesting body. A barb device may be included and be formed from a middle bight portion disposed within the barb receiving slot and a pair of barbs extending from the barb receiving slot on opposite sides of the fish harvesting body. A piercing tip may include a releasable connection device attachable to the connection device on the forward portion of the fish harvesting body for removably securing the piercing tip to the fish harvesting body and for securing the barb device within the barb receiving slot. The barb device may be rotatable from a fish piercing position in which said barbs lie in a plane substantially in alignment with the longitudinal axis of the fish harvesting body to a fish retaining position in which the barb device is rotated and the barbs are moved to an angle from the plane of the longitudinal axis when the pierce tip is fully engaged.

The fish harvesting head may include a recess along both intersections between an outer surface of the fish harvesting body and a surface forming the barb receiving slot at a location where the barb device resides during use to enable the barb device to rotate between the fish piercing position and the retaining position. The piercing tip covers the opening of the barb receiving slot on the distal outer surface of the fish harvesting body to prevent the piercing tip from being removed from the barb receiving slot and to prevent the barb device from rotating to a fish releasing position. The fish harvesting head may also include a piercing tip retaining device positioned in the barb receiving slot and in contact with an inner surface of the piercing tip for increasing resistance to movement of the piercing tip relative to the fish harvesting body. A proximatemost surface of the barb receiving slot may be positioned proximally of an intersection of the distal end of the outer surface of the fish harvesting body and the piercing tip to enable rotation of the barb device relative to the fish harvesting body between the fish piercing position and the fish retaining position.

An advantage of this invention is that the barb receiving slot enables the barb device to be easily removed and replaced by simply removing the piercing tip.

Another advantage of this invention is that the barb receiving slot enables the barb device to be removed to convert the fish harvesting head to a practice tip or to remove from an object shot by the arrow.

Yet another advantage of this invention is that the piercing tip retaining device prevents the piercing tip from accidentally being loosened and enabling the barbs of the barb device to rotate to a fish releasing position.

Another advantage of this invention is that the piercing tip retaining device prevents the piercing tip from accidentally being loosened and lost by dropping the piercing tip.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

FIG. 1 is a partially exploded top view of the fish harvesting head of this invention.

FIG. 2 is a partially exploded right side view of the fish harvesting head of this invention with the barb device in the fish penetrating position.

FIG. 3 is a partially exploded right side view of the fish harvesting head of this invention with the barb device in the fish retaining position.

FIG. 4 is an exploded top view of the fish harvesting head of this invention with the barb device in the fish penetrating position.

FIG. 5 is an exploded right side view of the fish harvesting head of this invention with the barb device in the fish penetrating position.

DETAILED DESCRIPTION OF THE INVENTION

As shown in FIGS. 1-5, this invention is directed to a fish harvesting head 10 attachable to an arrow 12 and usable to harvest fish with a bow and arrow 12. The fish harvesting head 10 may be formed from a fish harvesting body 14 with a piercing tip 16 releasably attached thereto. The fish harvesting body 14 may include a barb receiving slot 18 configured to releasably contain a barb device 20. The barb receiving slot 18 may be configured such that the barb device 20 may be easily replaceable if damaged or removable to facilitate conversion of the fish harvesting head 10 to a practice point for shooting at targets. The fish harvesting body 14 may also include a piercing tip retaining device 22 positioned in the barb receiving slot 18 and in contact with an inner surface 24 of the piercing tip 16 for increasing resistance to movement of the piercing tip 16 relative to the fish harvesting body 14, thereby ensuring that the piercing tip 16 is not loosened to allow the piercing tip 16 to rotate to a fish releasing position.

The fish harvesting head 10 may be formed, in part, by the fish harvesting body 14. The fish harvesting body 14 may have a forward portion 26 and a rear portion 28. The forward portion 26 may include a connection device 30. The connection device 30 may include threads and other appropriate releasable connectors. The rear portion 28 may include a connection device 32 for attachment to the arrow 12. The connection device 32 may be threads and other appropriate releasable connectors. The fish harvesting body 14 may be an elongated body having a generally cylindrical outer surface having a diameter approximately equal to an outer diameter of the arrow 12. In some embodiments, the fish harvesting body 14 may have slightly larger or smaller than the outer diameter of the arrow 12.

The fish harvesting body 14 may include the barb receiving slot 18 positioned in the forward portion 26 of the fish harvesting body 14 that extends along a longitudinal axis 34 of the fish harvesting body 14. The barb receiving slot 18 may extend a width of the fish harvesting body 14 with openings 36 on side surfaces 38 of the fish harvesting body 14, as shown in FIG. 1, and may include an opening 40 on a distal outer surface 42 of the fish harvesting body 14, as shown in FIG. 5. The barb receiving slot 18 may be configured to receive the barb device 20 formed with a middle bight portion 44 disposed within the barb receiving slot 18. The barb device 20 may also include a pair of barbs 46 extending from the barb receiving slot 18 on opposite sides of the fish harvesting body 14.

The barb device 20 may be kept in position with the piercing tip 16 attached to a distal end of the fish harvesting body 14 at the barb receiving slot 18. The piercing tip 16 may be conical or have one or more cutting arris, such as, but not limited to a trocar tip. The piercing tip 16 may include a connection device 54 on an inner surface of a cavity 56 in the piercing tip. The connection device 54 may be configured to mate with the connection device 30 on the fish harvesting body 14. The connection devices 30, 54 may be threads enabling a releasable connection to be established between the fish harvesting body 14 and the piercing tip 16.

The barb device 20 may be rotatable from a fish piercing position, shown in FIG. 1, in which the barbs 46 lie in a plane substantially in alignment with the longitudinal axis 34 of the fish harvesting body 14 to a fish retaining position, shown in FIG. 3, in which the barb device 20 is rotated and the barbs 46 are moved to an angle from the plane substantially in alignment with the longitudinal axis 34. As shown in FIG. 5, a recess 48 may be positioned along intersections between an outer surface 50 of the fish harvesting body 14 and a surface 52 forming the barb receiving slot 18 at a location where the barb device 20 resides during use to enable the barb device 20 to rotate between the fish piercing position and the retaining position.

The piercing tip 16 and the fish harvesting body 14 may be configured such that the outer surface 58 of the piercing tip 16 prevents the barb device 20 from rotating from the fish retaining position to a release position in which the barbs 46 of the barb device 20 are positioned approximately 180 degrees from the fish piercing position shown in FIG. 1. In particular, the recess 48 extends only in the fish harvesting body 14 and not into the piercing tip 16. Furthermore, a proximalmost surface 60 of the barb receiving slot 18, as shown in FIG. 5, is positioned proximally of an intersection of the distal end 62 of the outer surface 50 of the fish harvesting body 14 and the piercing tip 16 to enable rotation of the barb device 20 relative to the fish harvesting body 14 between the fish piercing position and the fish retaining position, yet not allow it to rotate to a fish releasing position. Rather, the barb device 20 may only be rotated to a fish releasing position when the piercing tip 16 is rotated and moved distally away from the fish harvesting body 14. The piercing tip 16 may only be rotated when the resistance of the piercing tip retaining device 22 is overcome. Such resistance is not overcome by ordinary use of the fish harvesting head 10 such as from vibration during shots or otherwise. The piercing tip retaining device 22 may extend slightly wider than a width of the barb receiving slot 18 to form an interference fit with the piercing tip 16. The piercing tip retaining device 22 may be formed from a material, such as, but not limited to rubber, nylon, polyurethane, a biased material, or other appropriate materials.

The fish harvesting head 10 may be assembled by inserting the middle bight portion 44 of the barb device 20 into the barb receiving slot 18. The barb device 20 may be positioned such that the barbs 46 extend along the longitudinal axis 34 toward the proximal end of the arrowhead 10. The piercing tip retaining device 22 may be inserted into the barb receiving slot 18, and the piercing tip 16 may be attached to the connection device 30. The piercing tip 16 may be attached such that the piercing tip contacts the fish harvesting body and enables rotation of the barb device 20 only between the fish piercing position and the fish retention position.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A fish harvesting head, comprising:
   a fish harvesting body having a forward portion and a rear portion, wherein the forward portion defines a distal end of the fish harvesting body and includes a connection device and the rear portion includes a connection device for attachment to a shaft;
   a barb receiving slot positioned in the forward portion of the fish harvesting body that extends along a longitudinal axis of the fish harvesting body, extending a width of the fish harvesting body with openings on side surfaces of the fish harvesting body and including an opening on a distal outer surface of the fish harvesting body at the distal end of the fish harvesting body, the barb receiving slot extending from the opening on the distal outer surface of the fish harvesting body toward the rear portion and terminating at a terminal end of the barb receiving slot located between the connection device of the forward portion and the connection device of the rear portion;

a barb device formed with a middle bight portion disposed within the barb receiving slot and a pair of barbs extending from the barb receiving slot on opposite sides of the fish harvesting body;

a piercing tip including a releasable connection device attachable to the connection device on the forward portion of the fish harvesting body for removably securing the piercing tip to the fish harvesting body and for securing the barb device within the barb receiving slot;

wherein the barb device is rotatable from a fish piercing position in which said barbs lie in a plane substantially in alignment with the longitudinal axis of the fish harvesting body to a fish retaining position in which the barb device is rotated and the barbs are moved to an angle from the plane substantially in alignment with the longitudinal axis;

recesses along intersections between another outer surface of the fish harvesting body and a surface forming the barb receiving slot at a location where the barb device resides during use to enable the barb device to rotate between the fish piercing position and the retaining position; and wherein the piercing tip covers the opening of the barb receiving slot on the distal outer surface of the fish harvesting body to prevent the barb device from being removed from the barb receiving slot, and the connection device of the forward portion is located along the longitudinal axis of the fish harvesting body between the opening at the distal end of the fish harvesting body and the terminal end of the barb receiving slot.

2. The fish harvesting head of claim 1, further comprising a piercing tip retaining device positioned in the barb receiving slot and in contact with an inner surface of the piercing tip for increasing resistance to movement of the piercing tip relative to the fish harvesting body.

3. The fish harvesting head of claim 1, wherein the connection device on the forward portion of the fish harvesting body includes threads engaged with threads of the releasable connection device of the piercing tip.

4. The fish harvesting head of claim 1, wherein a proximalmost surface of the barb receiving slot is positioned proximally of an intersection of a distal end of the another outer surface of the fish harvesting body and the piercing tip to enable rotation of the barb device relative to the fish harvesting body between the fish piercing position and the fish retaining position.

5. A fish harvesting head, comprising:

a fish harvesting body having a forward portion and a rear portion, wherein the forward portion defines a distal end of the fish harvesting body and includes a connection device and the rear portion includes a connection device for attachment to an arrow;

a barb receiving slot positioned in the forward portion of the fish harvesting body that extends along a longitudinal axis of the fish harvesting body, extending a width of the fish harvesting body with openings on side surfaces of the fish harvesting body and including an opening on a distal outer surface of the fish harvesting body at the distal end of the fish harvesting body, the barb receiving slot extending from the opening on the distal outer surface of the fish harvesting body toward the rear portion and terminating at a terminal end of the barb receiving slot located between the connection device of the forward portion and the connection device of the rear portion;

a barb device formed with a middle bight portion disposed within the barb receiving slot and a pair of barbs extending from the barb receiving slot on opposite sides of the fish harvesting body;

a piercing tip including a releasable connection device attachable to the connection device on the forward portion of the fish harvesting body for removably securing the piercing tip to the fish harvesting body and for securing the barb device within the barb receiving slot;

wherein the barb device is rotatable from a fish piercing position in which said barbs lie in a plane substantially in alignment with the longitudinal axis of the fish harvesting body to a fish retaining position in which the barb device is rotated and the barbs are moved to an angle from the plane substantially in alignment with the longitudinal axis;

a piercing tip retaining device positioned in the barb receiving slot and in contact with an inner surface of the piercing tip for increasing resistance to movement of the piercing tip relative to the fish harvesting body;

recesses along intersections between another outer surface of the fish harvesting body and a surface forming the barb receiving slot at a location where the barb device resides during use to enable the barb device to rotate between the fish piercing position and the retaining position; and wherein the piercing tip covers the opening of the barb receiving slot on the distal outer surface of the fish harvesting body to prevent the barb device from being removed from the barb receiving slot, and the connection device of the forward portion is located along the longitudinal axis of the fish harvesting body between the opening at the distal end of the fish harvesting body and the terminal end of the barb receiving slot.

6. The fish harvesting head of claim 5, wherein the connection device on the forward portion of the fish harvesting body includes threads engaged with threads of the releasable connection device of the piercing tip.

7. The fish harvesting head of claim 5, wherein a proximalmost surface of the barb receiving slot is positioned proximally of an intersection of a distal end of the another outer surface of the fish harvesting body and the piercing tip to enable rotation of the barb device relative to the fish harvesting body between the fish piercing position and the fish retaining position.

8. A fish harvesting head, comprising:

a fish harvesting body having a forward portion and a rear portion, wherein the forward portion defines a distal end of the fish harvesting body and includes external threads and the rear portion includes a connection device for attachment to an arrow;

a barb receiving slot positioned in the forward portion of the fish harvesting body that extends along a longitudinal axis of the fish harvesting body, extending a width of the fish harvesting body with openings on side surfaces of the fish harvesting body and including an opening on a distal outer surface of the fish harvesting body at the longitudinal axis and at the distal end of the fish harvesting body, the barb receiving slot extending from the opening on the distal outer surface of the fish harvesting body toward the rear portion and terminating at a terminal end of the barb receiving slot located between the external threads of the forward portion and the connection device of the rear portion;

a barb device formed with a middle bight portion disposed within the barb receiving slot and a pair of barbs extending from the barb receiving slot on opposite sides of the fish harvesting body;

a piercing tip including internal threads in a cavity attachable to the threads on the forward portion of the fish harvesting body for removably securing the piercing tip to the fish harvesting body and for securing the barb device within the barb receiving slot;

wherein the barb device is rotatable from a fish piercing position in which said barbs lie in a plane substantially in alignment with the longitudinal axis of the fish harvesting body to a fish retaining position in which the barb device is rotated and the barbs are moved to an angle from the plane substantially in alignment with the longitudinal axis;

a piercing tip retaining device positioned in the barb receiving slot and in contact with an inner surface of the piercing tip for increasing resistance to movement of the piercing tip relative to the fish harvesting body;

a recess at an intersection between another outer surface of the fish harvesting body and a surface forming the barb receiving slot at a location where the barb device resides during use to enable the barb device to rotate between the fish piercing position and the retaining position; and wherein the piercing tip covers the opening of the barb receiving slot on the distal outer surface of the fish harvesting body to prevent the barb device from being removed from the barb receiving slot and wherein a proximalmost surface of the barb receiving slot is positioned proximally of an intersection of a distal end of the another outer surface of the fish harvesting body and the piercing tip to enable rotation of the barb device relative to the fish harvesting body between the fish piercing position and the fish retaining position, and the external threads of the forward portion are located along the longitudinal axis of the fish harvesting body between the opening at the distal end of the fish harvesting body and the terminal end of the barb receiving slot.

* * * * *